US012564173B2

(12) United States Patent
Richmond

(10) Patent No.: US 12,564,173 B2
(45) Date of Patent: Mar. 3, 2026

(54) AUTOMATED SELF-CLEANING LITTER BOX

(71) Applicant: Douglas John Richmond, Woodville, TX (US)

(72) Inventor: Douglas John Richmond, Woodville, TX (US)

( * ) Notice: Subject to any disclaimer, the term of this patent is extended or adjusted under 35 U.S.C. 154(b) by 0 days.

(21) Appl. No.: 18/951,309

(22) Filed: Nov. 18, 2024

(65) Prior Publication Data

US 2025/0160293 A1    May 22, 2025

Related U.S. Application Data

(60) Provisional application No. 63/600,518, filed on Nov. 17, 2023.

(51) Int. Cl.
A01K 1/01 (2006.01)

(52) U.S. Cl.
CPC ............ A01K 1/011 (2013.01); A01K 1/0125 (2013.01)

(58) Field of Classification Search
CPC .............................. A01K 1/011; A01K 1/0125
See application file for complete search history.

(56) References Cited

U.S. PATENT DOCUMENTS

| 9,210,911 | B2 * | 12/2015 | Bernal | ............... | A01K 1/0114 |
| 10,362,762 | B2 * | 7/2019 | Fitch | .................... | A01K 1/0125 |
| 2008/0251026 | A1 | 10/2008 | Bell et al. | | |
| 2010/0122662 | A1 | 5/2010 | Kennington | | |
| 2014/0174369 | A1 * | 6/2014 | Bernal | ................... | A01K 1/011 |
| | | | | | 119/161 |
| 2017/0339911 | A1 * | 11/2017 | Fitch | .................... | A01K 1/0125 |
| 2021/0169036 | A1 | 6/2021 | Rachel | | |

FOREIGN PATENT DOCUMENTS

| WO | 2013030509 | A2 | 3/2013 |
| WO | 2017205630 | A2 | 11/2017 |

* cited by examiner

*Primary Examiner* — Jessica B Wong

(57) ABSTRACT

An automated self-cleaning litter box is a device intended to entice pets to the device and provide users with a litter box that conveniently cleans and disposes of pet waste. In order to accomplish this the device includes an upright section with an inbuilt grinding system, that grinds up and disposes of solid and liquid waste. Further, a horizontal base section receives liquid waste and folds to create an appealing design. Additionally, the control system controls the automated aspects of the device. Furthermore, a plurality of wheels allows the device to be transported easily and efficiently. An inbuilt water pumping system, and a drying and deodorizing system helps keep the litter box fresh and odor free. Thus, the device is an automatic self-cleaning litter box that disposes of waste and sanitizes an area without creating an unpleasant sight or odor.

14 Claims, 9 Drawing Sheets

AUTOMATED SELF-CLEANING LITTER BOX

The current application claims a priority to the U.S. provisional patent application Ser. No. 63/600,518 filed on Nov. 17, 2023. The current application is filed on Nov. 18, 2024, while Nov. 17, 2024 was on a weekend.

FIELD OF THE INVENTION

The present invention relates generally to a litter box for domesticated pets such as dogs and cats. More specifically, the present invention is a device that cleans and disposes of feces and urine with an inconspicuous appearance.

BACKGROUND OF THE INVENTION

Automatic cleaning litter boxes are innovative and convenient solutions designed to simplify the process of maintaining pet hygiene and litter cleanliness. These specialized litter boxes use technology to automatically sift, clean, and dispose of waste, thereby reducing the need for manual scooping and cleaning by pet owners. Equipped with sensors and mechanisms, automatic cleaning litter boxes can detect when a cat has used the box and initiate the cleaning process. After the cat exits, the litter box employs mechanisms like rotating, sifting, or raking to separate clumps of waste from clean litter. The waste is then collected in a separate compartment or disposable container, while the clean litter is returned to the main chamber, ready for the next use. These litter boxes offer several advantages, such as convenience, odor control, hygiene, and accommodating multiple cat households. While automatic cleaning litter boxes offer convenience, they also require maintenance, including regular emptying of waste containers and cleaning of internal components. It's important to select a model that suits the size of the cat, the number of cats in the household, and the type of litter used. Overall, these modern litter boxes are valuable tools for cat owners seeking to streamline litter box maintenance and provide their feline companions with a clean and comfortable space. Unfortunately, automatic cleaning devices do not exist for dogs within the market. This requires dog owners to constantly take their dog outside, in order for their dog to go to the bathroom.

An objective of the present invention is to provide users with a litter box, to help owners not have to manually clean up after their pets. The present invention intends to provide users with a device that allows pets to urinate and defecate indoors without an unpleasant odor or appearance. To that end, a horizontal base section of the present invention allows pets to go to the bathroom before closing up to create an inconspicuous appearance. An inbuilt water pumping system, and a drying and deodorizing system helps keep the litter box fresh and odor free. Thus, the present invention is an automatic self-cleaning litter box that disposes of waste and sanitizes an area without creating an unpleasant sight or odor.

SUMMARY OF THE INVENTION

The present invention is a self-cleaning litter box for pets, specifically for dogs that entices the dog to the device. The present invention seeks to provide users with a device that conveniently cleans and disposes of pet waste. In order to accomplish this the present invention comprises an upright section with an inbuilt grinding system, that grinds up and disposes of solid and liquid waste. Further, a horizontal base section receives liquid waste and folds to create an appealing design. Additionally, the control system controls the automated aspects of the device. Furthermore, a plurality of wheels allows the present invention to be transported easily and efficiently. An inbuilt water pumping system, and drying, disinfecting, and deodorizing systems helps keep the litter box fresh and odor free. Thus, the present invention is an automatic self-cleaning litter box that disposes of waste and sanitizes an area without creating an unpleasant sight or odor.

DETAILED DESCRIPTION OF THE INVENTION

Figure 1:
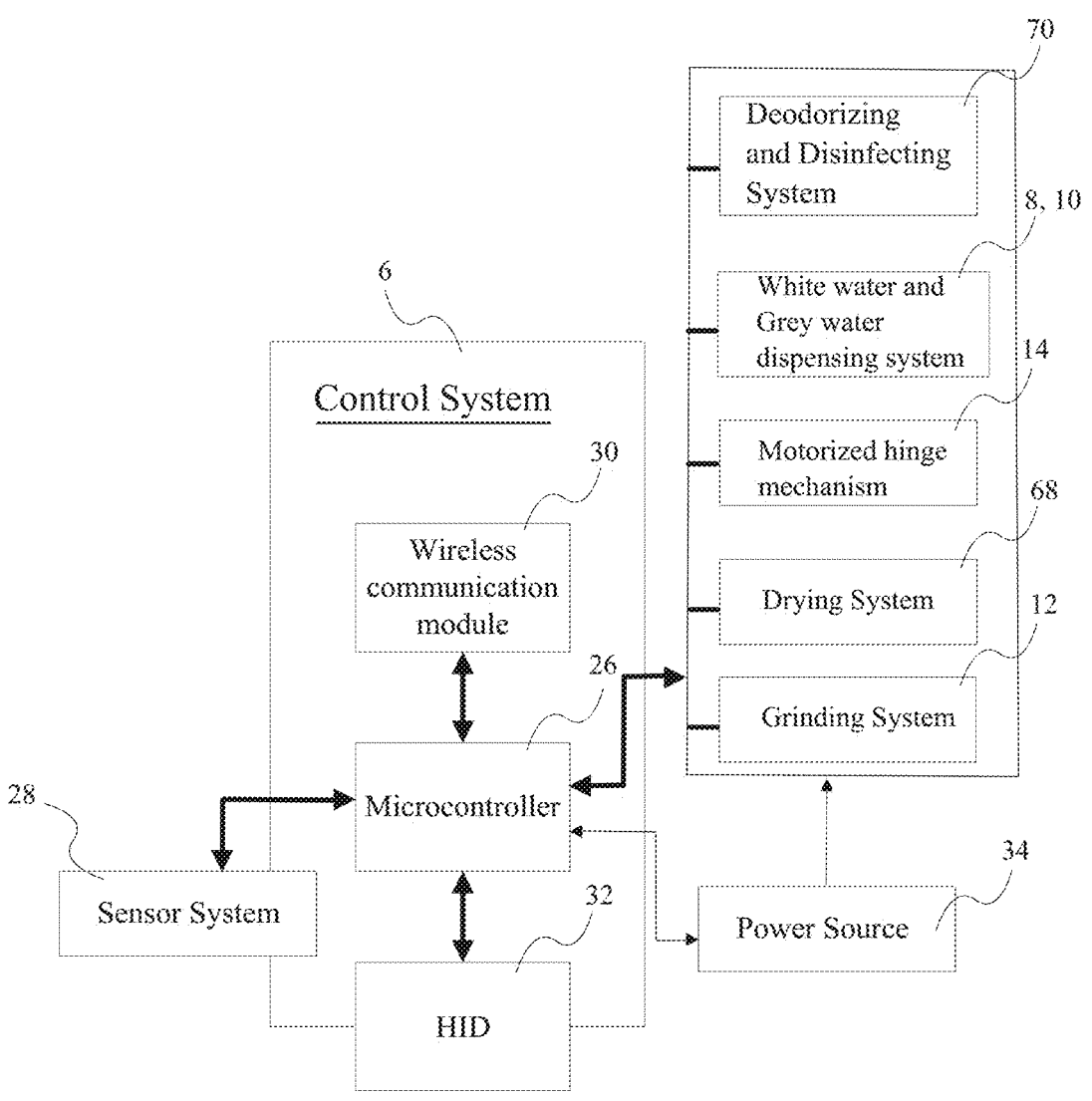
FIG. 1 is a system diagram of the control system of the present invention, wherein thicker flowlines represent electronic connections, and thinner flowlines represent electrical connections.

All illustrations of the drawings are for the purpose of describing selected versions of the present invention and are not intended to limit the scope of the present invention.

In reference to FIG. 1 through FIG. 9, the present invention is an automated self-cleaning litter box. The following description is in reference to FIG. 1 through FIG. 9. According to a preferred embodiment, the present invention comprises a base receptacle 2, an upright receptacle 4, a control system 6, a white-water dispensing system 8, a grey-water dispensing system 10, a grinding system 12, a motorized hinge mechanism 14, and an inclined distribution conveyor 16. All of these components together allow for the device to dispose of the waste in the litter box, and clean and dry the litter box, while maintaining an inconspicuous appearance. Preferably, the base receptacle 2 is a horizontal section on top of which the pet comes to defecate and/or urinate. Accordingly, the base receptacle 2 comprises an excrement-depositing surface 18 and a base inner cavity 20. Further, the base inner cavity 20 traverses through the excrement-depositing surface 18 and into the base receptacle 2. In the preferred embodiment, the upright receptacle 4 comprises an excrement-receiving surface 22 and an upright inner cavity 24. To that end, the upright inner cavity 24 traverses through the excrement-receiving surface 22 and into the upright receptacle 4. According to the preferred embodiment, the base receptacle 2 and the upright receptacle 4 are made of sturdy materials like wood, metal, hard plastic, etc., have rectangular outer surfaces, and have inner surfaces and compartments of various shapes and angles. Furthermore, during operation of the present invention, the base receptacle 2 and the upright receptacle 4 open and close at various stages. Accordingly, the dimensions of the base receptacle 2 and the upright receptacle 4 match to open and close like two sides of a suitcase. However, the base receptacle 2 and the upright receptacle 4 may have any other shape, dimensions, materials, components, arrangement of components etc. that are known to one of ordinary skill in the art, as long as the intents of the present invention are not altered.

In order to clean the interiors of the litter box multiple times in an efficient manner, the white-water dispensing system 8 and the grey-water dispensing system 10 are mounted within the upright receptacle 4. More specifically, the white-water dispensing system 8 is a fresh or clean water dispensing system and the grey-water dispensing system 10 is a recycled water dispensing system. Both the water dispensing systems work in different cycles based on the instructions saved and relayed by the control system 6.

In order to break down and dispose of the pet's feces in an effective manner, the grinding system 12 and the inclined distribution conveyor 16 are mounted within the upright receptacle 4. During the closed configuration, the feces on the base receptacle 2 falls onto the inclined distribution conveyor 16. Thus, the base receptacle 2 is in fluid communication with the inclined distribution conveyor 16. The inclined distribution conveyer is a panel on the upright receptacle 4 that directs the feces that fall from the base receptacle 2 into the grinding system 12, to be broken down and disposed.

Figure 2:
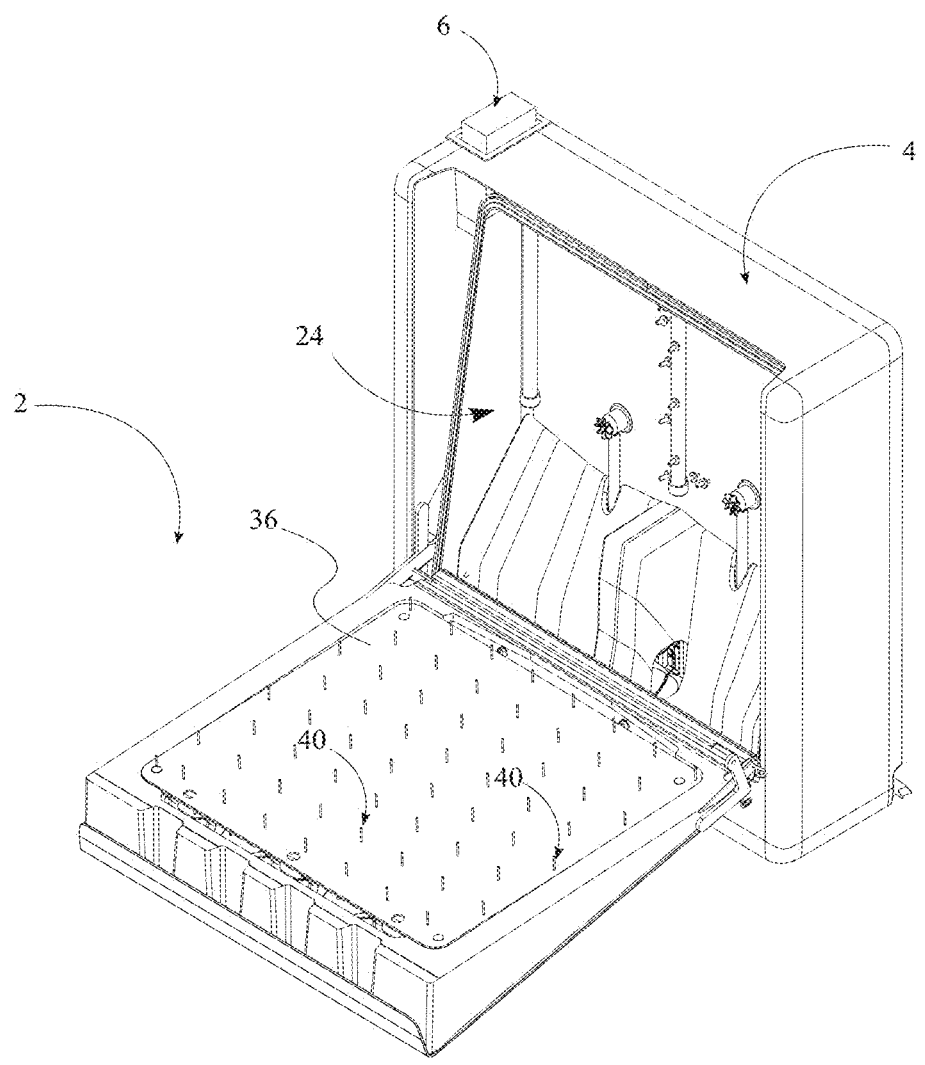
FIG. 2 is a top-front perspective of the present invention in an open configuration.
Figure 3:
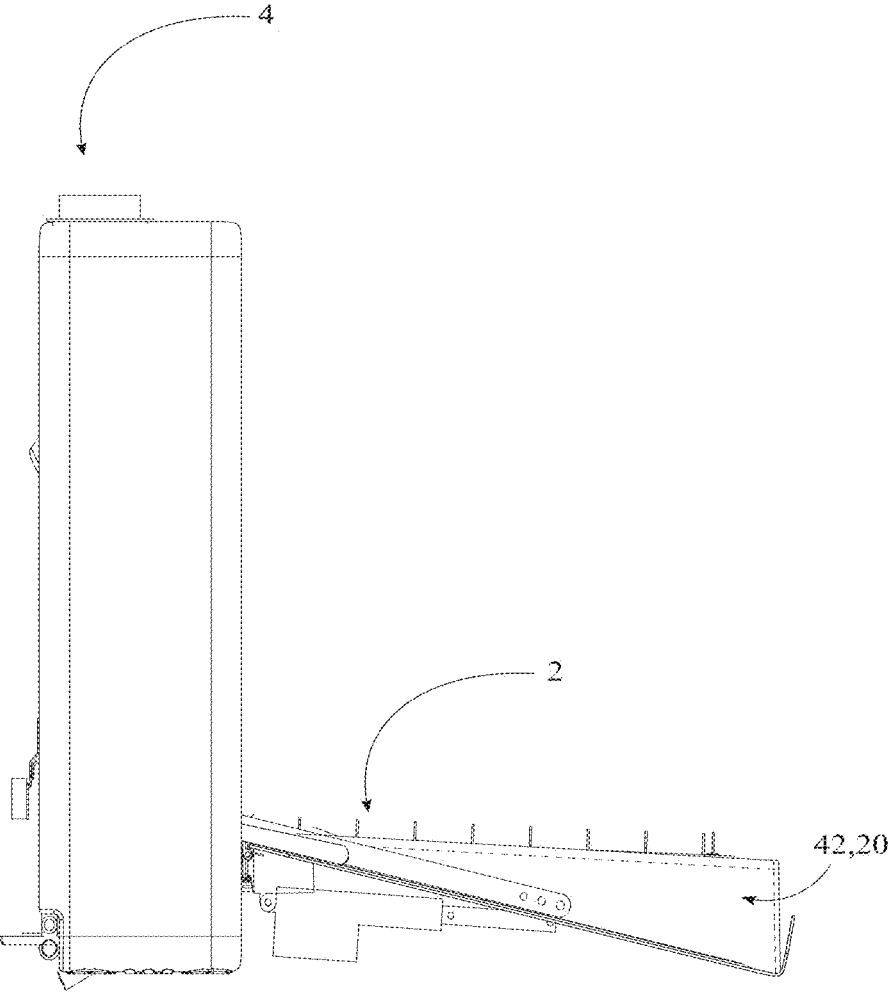
FIG. 3 is a side perspective view of the present invention in open configuration.
Figure 4:
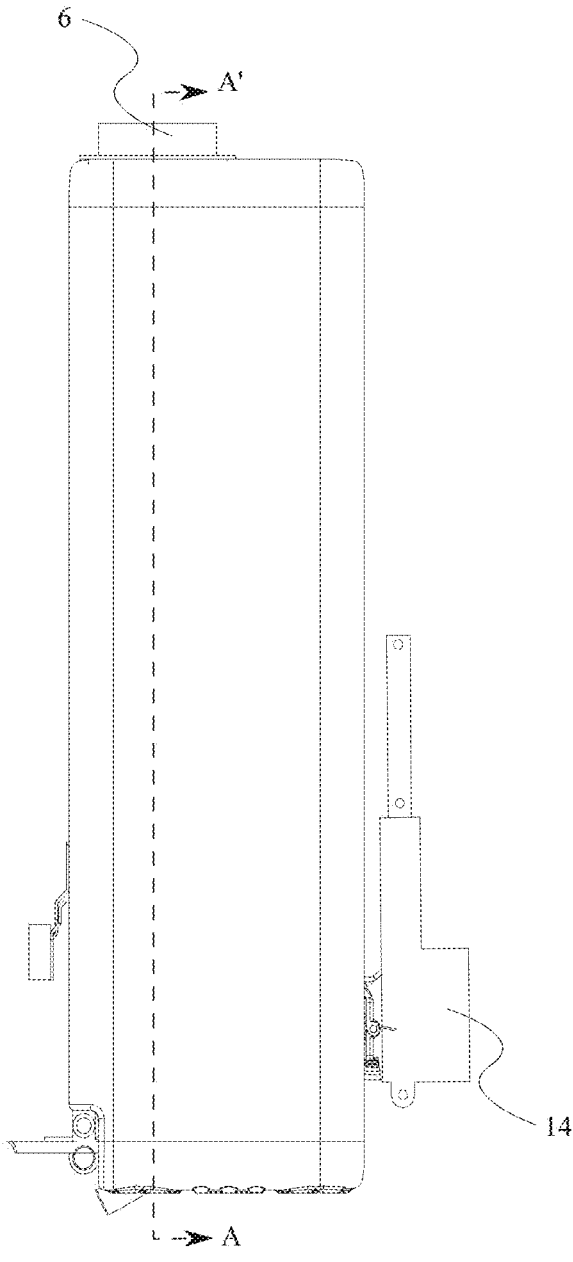
FIG. 4 is a side perspective view of the present invention in a closed configuration.

According to the preferred embodiment, the motorized hinge mechanism 14 helps the litter box to close and open about a hinge. To that end, the motorized hinge mechanism 14 is positioned adjacent to the base inner cavity 20, and the motorized hinge mechanism 14 is positioned adjacent to the upright inner cavity 24. Further, the motorized hinge mechanism 14 is operatively coupled in between the base receptacle 2 and the upright receptacle 4, wherein the motorized hinge mechanism 14 is used to move the base receptacle 2 and the upright receptacle 4 between an open configuration and a closed configuration. This is so that after the pet excretes onto the base receptacle 2 during the open configuration, the device goes into the closed configuration for the cleaning process, thereby creating a litter box that disposes of waste and sanitizes an area without creating an unpleasant sight or odor. More specifically, the motorized hinge mechanism 14 utilizes electrical power to create a force that pivots the base receptacle 2 along the bottom of the upright receptacle 4 to open and close the present invention as seen in FIG. 2 through FIG. 4. Thus, wherein the base receptacle 2 and the upright receptacle 4 are arranged in the open configuration, the excrement-depositing surface 18 and the excrement-receiving surface 22 are flat surfaces. Further, as seen in FIG. 2, the excrement-depositing surface 18 and the excrement-receiving surface 22 are positioned perpendicular to each other. Alternately, as seen in FIG. 4, wherein the base receptacle 2 and the upright receptacle 4 are arranged in the closed configuration, the excrement-depositing surface 18 and the excrement-receiving surface 22 are flat surfaces, and the excrement-depositing surface 18 and the excrement-receiving surface 22 are positioned coincident to each other.

To further enable effective cleaning in multiple phases, the white-water dispensing system 8 and the grey-water dispensing system 10 are in fluid communication with the base receptacle 2. Furthermore, the inclined distribution conveyor 16 is in fluid communication with the grey-water dispensing mechanism and the grinding system 12. This is so that water from the white-water dispensing mechanism that first falls on the base receptacle 2 for the first round of cleaning gets collected and recycled by the grey-water dispensing mechanism for a second round of cleaning and/or flushing of the grinding system 12. Following that, the dirty water gets disposed of through the grinding system 12.

In order to accomplish the functionalities of the present invention, the control system 6 is integrated within the upright receptacle 4. As seen in FIG. 1, the control system 6 is a combination of electrical and electronic components that enable the present invention to perform the intended functions. Accordingly, the control system 6 is operatively coupled to the motorized hinge mechanism 14, the white-water dispensing system 8, the grey-water dispensing system 10, and the grinding system 12, wherein the control system 6 is used to actuate and retard the motorized hinge mechanism 14, the white-water dispensing system 8, the grey-water dispensing system 10, and the grinding system 12.

A more detailed description of the present invention follows.

In reference to FIG. 1, the control system 6 may comprise a microcontroller 26, a sensor system 28, a wireless communication module 30, and at least one HID 32 (human interface device). Preferably, the microcontroller 26 is a processing unit or an integrated circuit that controls the functions of the electric and electronic components of the present invention. Accordingly, the microcontroller 26 is electronically connected to the sensor system 28, the wireless communication module 30, the at least one HID 32, the motorized hinge mechanism 14, the white-water dispensing system 8, the grey-water dispensing system 10, and the grinding system 12.

The sensor system 28 utilizes a plurality of sensors integrated into the base receptacle 2 and the upright receptacle 4 to monitor the surrounding environment. Preferably, the sensor system 28 detects the presence of the pet on the base receptacle 2 and conveys that information to the microcontroller 26. Once the pet leaves the base receptacle 2 and the sensor system 28 detects the presence or urine or feces a second signal is transmitted to the microcontroller 26 which thereby initiates the automated cleaning process of the litter box. To further actuate efficient closing and opening of the litter box multiple timers and different kinds of sensors are integrated into the device.

In an alternate embodiment, the plurality of sensors may be designed with standard camera sensors and ultrasonic sensors to detect and verify the behaviors of pets using the present invention. This design allows for the present invention to train a pet while the user is in a remote location and not with their pet. The training and treat-dispenser monitor the behavior of the pet while around the present invention with the sensor system 28. The training and treat dispenser may comprise a treat device that drops a treat for the pet as directed to by the user or automatically once the present invention has sensed that the pet used the bathroom on the present invention. The treat system further utilizes a touch screen and camera that allows a user to chat directly with their pet, or send prerecorded messages to their pet, and remotely reward their pet for good behavior.

Continuing with the preferred embodiment, the wireless communication module 30 allows the control system 6 to communicate with an external mobile electronic device such as a cellphone through Wi-Fi or Bluetooth means. Accordingly, the microcontroller 26 and the wireless communication module 30 are mounted within the upright cavity, and the sensor system 28 is mounted adjacent to the base receptacle 2. In the preferred embodiment, the at least one HID 32 is externally mounted to the upright receptacle 4. The at least one HID 32 is a plurality of switches that is positioned along the surface of the upright receptacle 4 or standing section, and allows for the present invention to open, close, disinfect, and run the pump system. However, it should be noted that the at least one HID 32 may comprise any types of interaction systems such as knobs, touch screen, voice detection devices, etc. and the sensor system 28 may also comprise any kind of sensors that are known to one of ordinary skill in the art, as long as the intents of the present invention are not altered.

In order to provide electrical power to the electrical and electronic components, the present invention may further comprise a power source 34. Preferably, the power source 34 is mounted within the upright cavity. Further, the control system 6, the motorized hinge mechanism 14, the white-water dispensing system 8, the grey-water dispensing system 10, and the grinding system 12 being electrically connected to the power source 34. The power source 34 preferably is a rechargeable battery. However, any other sources of power such as a power cable to an external power outlet, solar power, power through other charging cables etc. may be utilized, as long as the objectives of the present invention are not hindered.

Figure 9:
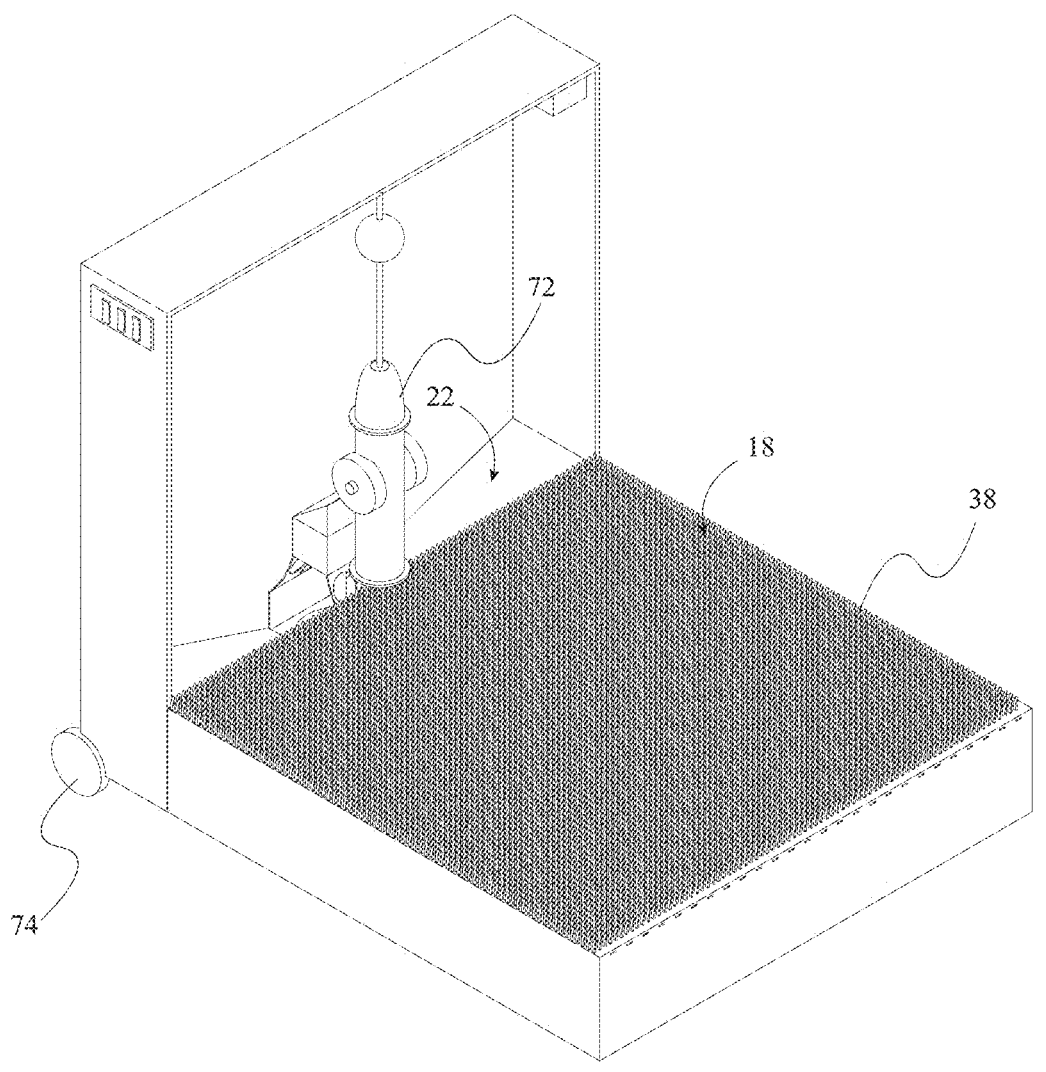
FIG. 9 is an alternate embodiment of the present invention showing the fire hydrant replica and the grass pad.

As seen in FIG. 2 and FIG. 9, the base receptacle 2 may further comprise a base frame 36, a grass pad 38, a plurality of drainage holes 40, and a collection area 42. Preferably, the grass pad 38 is positioned along the top side of the base receptacle 2. The grass pad 38 is artificial grass with drainage holes positioned throughout the surface to allow urine to pass through to the other side. The base frame 36 is mounted adjacent and across the base inner cavity 20 for providing additional structural support. Preferably, the base frame 36 is a wired metal sheet that allows pets to walk on top of the grass pad 38 without altering the surface slope. Accordingly, the grass pad 38 is mounted adjacent and across the base frame 36, opposite to the base inner cavity 20, and the plurality of drainage holes 40 traverses through the grass pad 38. The collection area 42 is positioned below the grass pad 38 within the base receptacle 2. The collection area 42 is a series of sloped walls, leading to a drain. The collection area 42 is designed to receive liquid waste such as urine and return the liquid to the pump system within the standing section. In other words, the collection area 42 is integrated into the base inner cavity 20, and the plurality of drainage holes 40 being in fluid communication with the collection area 42.

Figure 5:
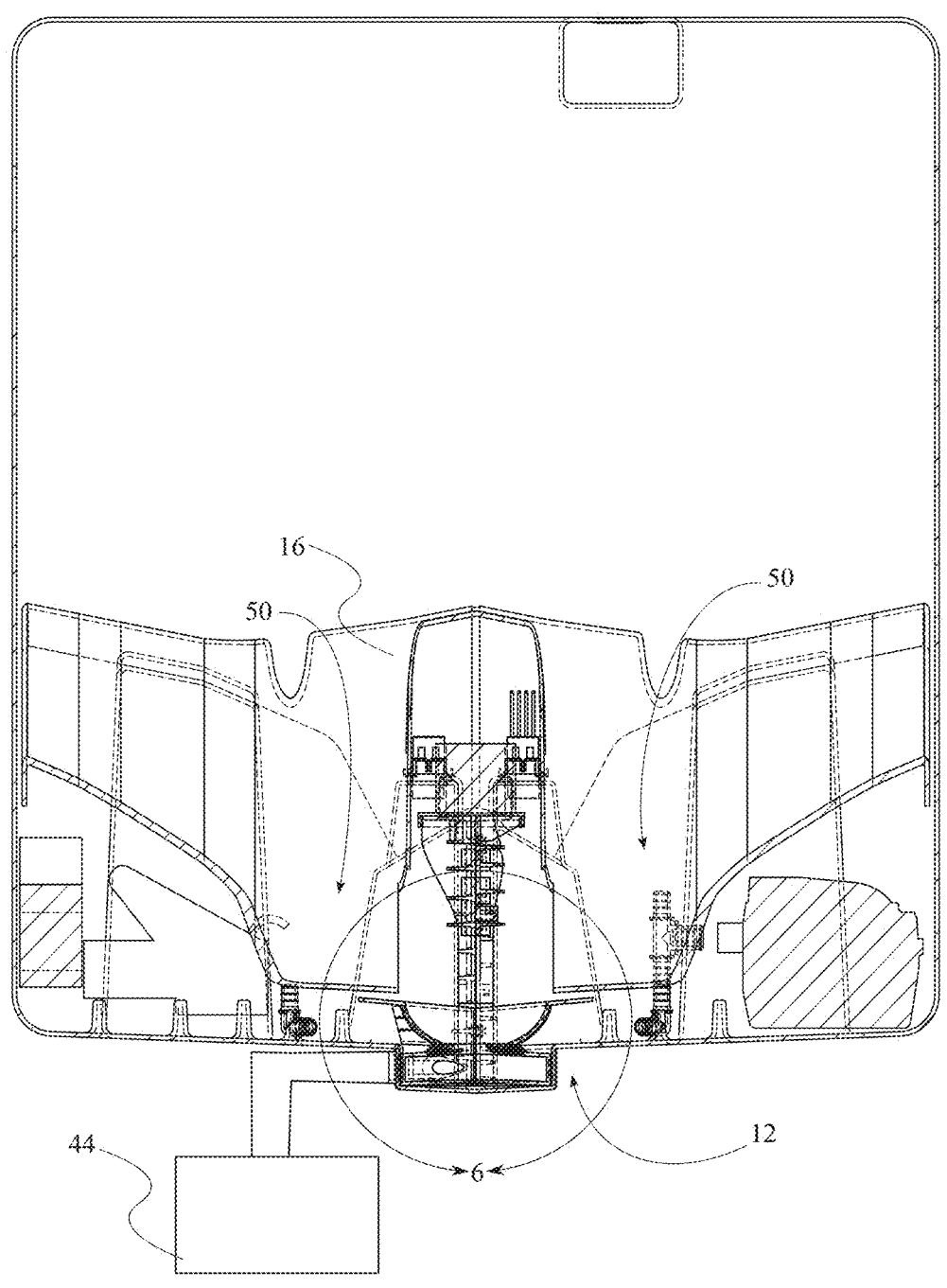
FIG. 5 is a sectional view taken along A-A' of FIG. 4.
Figure 6:
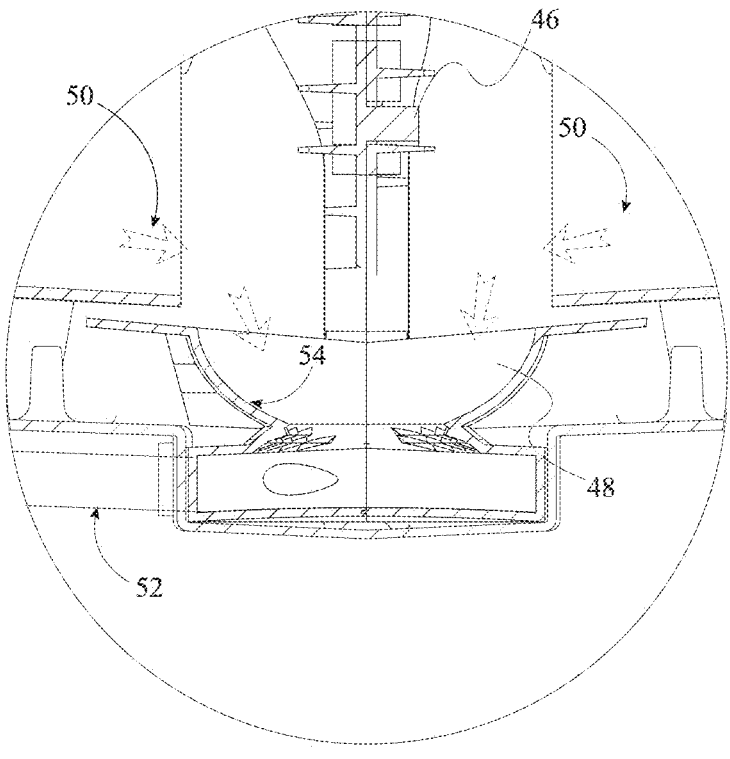
FIG. 6 is a detailed view of section 6 of FIG. 5, wherein broken arrows represent the direction in which feces and other washed down waste go to the grinding system.
Figure 7:
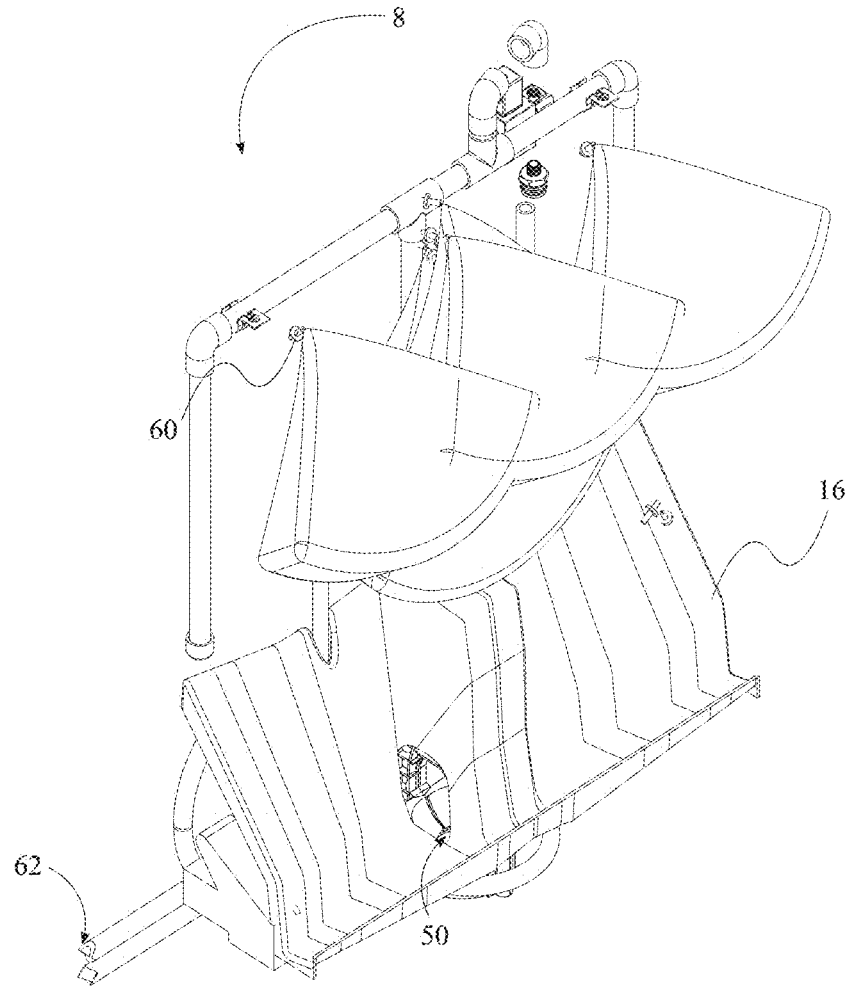
FIG. 7 is a top-front perspective view of the present invention showing only the white water and grey water dispensing systems and the inclined distribution conveyor.
Figure 8:
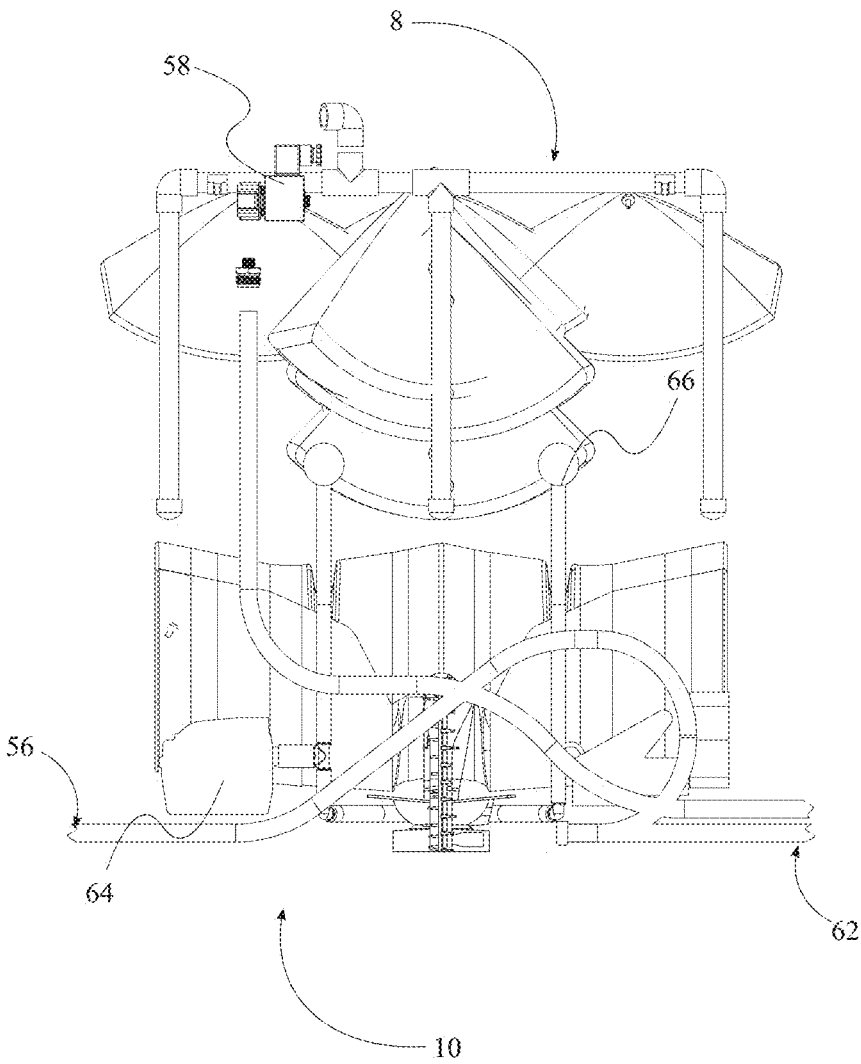
FIG. 8 is a rear elevational view of the present invention showing only the white water and grey water dispensing systems and the inclined distribution conveyor.

Continuing with the preferred embodiment and in reference to FIG. 5 and FIG. 6, the present invention further comprises a waste disposal unit 44. Preferably, the waste disposal unit 44 is positioned offset from the upright receptacle 4. Further, the grinding system 12 may comprise a grinder mechanism 46, a grinder housing 48, at least one grinder inlet 50 and a grinder outlet 52. Preferably, the grinder mechanism 46 comprises a paddle wheel. As the present invention closes, the feces on the base receptacle 2 rolls down towards the grinder mechanism 46 through the at least one grinder inlet 50, and the paddle wheel rotates to break apart the feces. As seen in FIG. 6, the paddle wheel is a plurality of paddles attached to a rotating rod that spins around a central axis. The paddle wheel sits within grinder housing 48, which is a cylindrical hole with a coarse inner surface. More specifically, the grinding system 12 may further comprise a coarse material 54, wherein the coarse material 54 is mounted within the grinder housing 48, and the coarse material 54 is positioned about the grinder mechanism 46. This design further breaks down the feces as the paddle wheel moves it along the coarse wall. To that end, the at least one grinder inlet 50 is in fluid communication with the grinder outlet 52 through the grinder housing 48, and the grinder mechanism 46 is mounted within the grinder housing 48. The grinder outlet 52 is attached to the bottom of the grinder mechanism 46 and directs all the feces and urine out of the present invention to an external waste disposal unit 44. Thus, the grinder outlet 52 is in fluid communication with the waste disposal unit 44. As seen in FIG. 7, the inclined distribution conveyor 16 is in fluid communication with the at least one grinder inlet 50. It should be further noted that the inclined distribution conveyor 16 can be created in many various shapes and sizes and the grinding system 12 can be designed in various ways while still staying within the scope of the present invention. In the preferred embodiment, the at least one grinder inlet 50 is a pair of grinder inlets, and the pair of grinder inlets is positioned opposite to each other about the grinder housing 48. Further, as seen in FIG. 5, the inclined distribution conveyor 16 is in fluid communication with each of the pair of grinder inlets.

According to the preferred embodiment, the white-water dispensing system 8 comprises a white-water inlet 56, at least one white-water pump 58, and at least one white-water outlet 60. Preferably, the at least one white-water outlet 60 is at least one spray nozzle, and the white-water inlet 56 is in fluid communication with the at least one white-water outlet 60 through the at least one white-water pump 58. As seen in FIG. 7, the at least one white-water outlet 60 is oriented towards the excrement-depositing surface 18 and the base inner cavity 20. Similarly, the grey-water dispensing system 10 may comprise a grey-water inlet 62, at least one grey-water pump 64, and at least one grey-water outlet 66. Preferably, the at least one grey-water outlet 66 is at least one spray nozzle. Further, the inclined distribution conveyor 16 is in fluid communication with the grey-water inlet 62. This is so that the water falling on the inclined distribution conveyor 16 is recycled by the grey-water pump. Furthermore, the grey-water inlet 62 is in fluid communication with the at least one grey-water outlet 66 through the at least one grey-water pump 64, and the at least one grey-water outlet 66 is oriented towards the excrement-depositing surface 18 and the base inner cavity 20.

Continuing with the preferred embodiment, the present invention further comprises a drying system 68, wherein the drying system 68 is mounted within the upright receptacle 4. Following the cleaning cycle by the white-water dispensing system 8 and the grey-water dispensing system 10, the device gets dried with the drying system 68. To that end, the drying system 68 is oriented towards the excrement-receiving surface 22, and the drying system 68 is operatively coupled with the control system 6, wherein the control system 6 is further used to actuate and retard the drying system 68.

According to the preferred embodiment, the present invention further comprises a deodorizing and disinfecting system 70, wherein the deodorizing and disinfecting system 70 is mounted within the upright receptacle 4. Preferably, the deodorizing and disinfectant system comprises a sprayer device. The sprayer device sprays a disinfectant/deodorizing solution and water onto the surface of the upright receptacle 4 and base receptacle 2 to properly clean and deodorize the surrounding area after a pet has gone to the bathroom. Preferably, the deodorizing and disinfecting system 70 is oriented towards the excrement-receiving surface 22, and the deodorizing and disinfecting system 70 are operatively coupled with the control system 6, wherein the control system 6 is further used to actuate and retard the deodorizing system. Furthermore, the disinfectant sprayer device also sprays water into the grinding system 12 breaking up larger pieces of feces. The sprayer device utilizes destructive wave interference patterns to create several streams of water from different directions that meet in a grinding area where the paddle wheel and coarse wall are. All cleaning streams are dual purpose designed to clean and disinfect the grass while creating streams of water in directions that push everything into the grinding area. The grinding area keeps the solids within that area while pummeling the feces from above with pinpoint jets of water designed to break up the feces and allows it to pass through a grate that surrounds a dirty water pump which is pumped out through a hose. The grinding system 12 has both a float and a trigger wire so the microcontroller 26 can control when the grinder mechanism 46 activates in case the float is stuck.

It is an objective of the present invention to attract a pet with the upright receptacle 4. To accomplish this, the present invention comprises a fire hydrant replica. In other words, the upright receptacle 4 comprises a fire hydrant replica, that is located centrally along the bottom side of the upright receptacle 4 as shown in FIG. 9. The fire hydrant replica 72 is designed to mimic an actual fire hydrant and attract a pet to urinate within the specified area. Preferably, the fire hydrant replica 72 is movably mounted within the upper inner cavity, adjacent to the excrement-receiving surface 22. More specifically, the fire hydrant replica 72 comprises a ball system. The ball system is a ball and a securing rope. The securing rope attaches the fire hydrant replica 72 to the top of the standing section. This design pulls the fire hydrant back when the present invention is closed to ensure feces are not smeared along the fire hydrant.

Continuing with the preferred embodiment, the present invention comprises a plurality of wheels 74, wherein the plurality of wheels 74 is rotatably mounted onto the upright receptacle 4, The plurality of wheels 74 allows for the present invention to easily move about a location without needing to completely lift the present invention up. With all the components working in tandem with each other it can be seen that the present invention is an automatic self-cleaning litter box that disposes of waste and sanitizes an area without creating an unpleasant sight or odor.

Although the invention has been explained in relation to its preferred embodiment, it is to be understood that many other possible modifications and variations can be made without departing from the spirit and scope of the invention as hereinafter claimed.

What is claimed is:

1. An automated self-cleaning litter box comprising:
a base receptacle;
an upright receptacle;
a control system;
a white-water dispensing system and a grey-water dispensing system;
a grinding system;
a motorized hinge mechanism;
an inclined distribution conveyor;
the base receptacle comprising an excrement-depositing surface and a base inner cavity;
the upright receptacle comprising an excrement-receiving surface and an upright inner cavity;
the base inner cavity traversing through the excrement-depositing surface and into the base receptacle;
the upright inner cavity traversing through the excrement-receiving surface and into the upright receptacle;

the motorized hinge mechanism being positioned adjacent to the base inner cavity;
the motorized hinge mechanism being positioned adjacent to the upright inner cavity;
the motorized hinge mechanism being operatively coupled in between the base receptacle and the upright receptacle, wherein the motorized hinge mechanism is used to move the base receptacle and the upright receptacle between an open configuration and a closed configuration;
the white-water dispensing system, the grey-water dispensing system, the grinding system, and the inclined distribution conveyor being mounted within the upright inner cavity;
the white-water dispensing system and the grey-water dispensing system being in fluid communication with the base receptacle;
the base receptacle being in fluid communication with the inclined distribution conveyor;
the inclined distribution conveyor being in fluid communication with the grey-water dispensing mechanism and the grinding system; and
the control system being operatively coupled to the motorized hinge mechanism, the white-water dispensing system, the grey-water dispensing system, and the grinding system, wherein the control system is used to actuate and retard the motorized hinge mechanism, the white-water dispensing system, the grey-water dispensing system, and the grinding system.

2. The automated self-cleaning litter box of claim 1 further comprising:
the control system comprising a microcontroller, a sensor system, a wireless communication module, and at least one HID (human interface device);
the microcontroller and the wireless communication module being mounted within the upright cavity;
the sensor system being mounted adjacent to the base receptacle;
the at least one HID being externally mounted to the upright receptacle; and
the microcontroller being electronically connected to the sensor system, the wireless communication module, the at least one HID, the motorized hinge mechanism, the white-water dispensing system, the grey-water dispensing system, and the grinding system.

3. The automated self-cleaning litter box of claim 1 further comprising:
a power source;
the power source being mounted within the upright cavity; and
the control system, the motorized hinge mechanism, the white-water dispensing system, the grey-water dispensing system, and the grinding system being electrically connected to the power source.

4. The automated self-cleaning litter box of claim 1 further comprising:
the base receptacle further comprising a base frame, a grass pad, a plurality of drainage holes, and a collection area;
the base frame being mounted adjacent and across the base inner cavity;
the grass pad being mounted adjacent and across the base frame, opposite to the base inner cavity;
the plurality of drainage holes traversing through the grass pad;
the collection area being integrated into the base inner cavity; and the plurality of drainage holes being in fluid communication with the collection area.

5. The automated self-cleaning litter box of claim 1 further comprising:

a waste disposal unit;

the grinding system comprising a grinder mechanism, a grinder housing, at least one grinder inlet and a grinder outlet;

the at least one grinder inlet being in fluid communication with the grinder outlet through the grinder housing;

the grinder mechanism being mounted within the grinder housing;

the inclined distribution conveyor being in fluid communication with the at least one grinder inlet;

the grinder outlet being in fluid communication with the waste disposal unit; and the waste disposal unit being positioned offset from the upright receptacle.

6. The automated self-cleaning litter box of claim 5 further comprising:

the at least one grinder inlet being a pair of grinder inlets;

the grinding system further comprising a coarse material;

the coarse material being mounted within the grinder housing;

the coarse material being positioned about the grinder mechanism;

the pair of grinder inlets being positioned opposite to each other about the grinder housing; and the inclined distribution conveyor being in fluid communication with each of the pair of grinder inlets.

7. The automated self-cleaning litter box of claim 1 further comprising:

the white-water dispensing system comprising a white-water inlet, at least one white-water pump, and at least one white-water outlet;

the at least one white-water outlet being at least one spray nozzle;

the white-water inlet being in fluid communication with the at least one white-water outlet through the at least one white-water pump; and the at least one white-water outlet being oriented towards the excrement-depositing surface and the base inner cavity.

8. The automated self-cleaning litter box of claim 1 further comprising:

the grey-water dispensing system comprising a grey-water inlet, at least one grey-water pump, and at least one grey-water outlet;

the at least one grey-water outlet being at least one spray nozzle;

the inclined distribution conveyor being in fluid communication with the grey-water inlet;

the grey-water inlet being in fluid communication with the at least one grey-water outlet through the at least one grey-water pump; and the at least one grey-water outlet being oriented towards the excrement-depositing surface and the base inner cavity.

9. The automated self-cleaning litter box of claim 1 further comprising:

a drying system;

the drying system being mounted within the upright receptacle;

the drying system being oriented towards the excrement-receiving surface; and the drying system being operatively coupled with the control system, wherein the control system is further used to actuate and retard the drying system.

10. The automated self-cleaning litter box of claim 1 further comprising:

a deodorizing and disinfecting system;

the deodorizing and disinfecting system being mounted within the upright receptacle;

the deodorizing and disinfecting system being oriented towards the excrement-receiving surface; and the deodorizing and disinfecting system being operatively coupled with the control system, wherein the control system is further used to actuate and retard the deodorizing system.

11. The automated self-cleaning litter box of claim 1 further comprising:

a fire hydrant replica; and the fire hydrant replica being movably mounted within the upper inner cavity, adjacent to the excrement-receiving surface.

12. The automated self-cleaning litter box of claim 1 further comprising:

a plurality of wheels; and the plurality of wheels being rotatably mounted onto the upright receptacle.

13. The automated self-cleaning litter box of claim 1 further comprising:

wherein the base receptacle and the upright receptacle are arranged in the open configuration;

the excrement-depositing surface and the excrement-receiving surface being flat surfaces; and the excrement-depositing surface and the excrement-receiving surface being positioned perpendicular to each other.

14. The automated self-cleaning litter box of claim 1 further comprising:

wherein the base receptacle and the upright receptacle are arranged in the closed configuration;

the excrement-depositing surface and the excrement-receiving surface being flat surfaces; and the excrement-depositing surface and the excrement-receiving surface being positioned coincident to each other.

* * * * *